(12) United States Patent
Becker

(10) Patent No.: US 7,907,049 B2
(45) Date of Patent: Mar. 15, 2011

(54) METHOD FOR PASSING A FAILSAFE ALARM SIGNAL THROUGH A LIFE SAFETY SYSTEM THAT EXPERIENCES A CATASTROPHIC FAILURE

(75) Inventor: Donald Edward Becker, Bradenton, FL (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 165 days.

(21) Appl. No.: 11/961,383

(22) Filed: Dec. 20, 2007

(65) Prior Publication Data

US 2009/0160669 A1    Jun. 25, 2009

(51) Int. Cl.
*G08B 29/00* (2006.01)
(52) U.S. Cl. ...... 340/507; 340/506; 340/3.1; 340/825.36; 340/825.49
(58) Field of Classification Search .................. 340/506, 340/507, 3.1, 517, 521, 825.36, 825.49
See application file for complete search history.

(56) References Cited

U.S. PATENT DOCUMENTS

| | | | |
|---|---|---|---|
| 3,656,158 A | | 4/1972 | Goodwater |
| 5,400,246 A | * | 3/1995 | Wilson et al. ............... 700/17 |
| 6,145,102 A | | 11/2000 | Klein et al. |
| 2006/0107098 A1 | | 5/2006 | Maki et al. |
| 2006/0112318 A1 | | 5/2006 | Yoda |

OTHER PUBLICATIONS

European Search Report for EP08171423; dated Jul. 20, 2010; 7 pages.

* cited by examiner

*Primary Examiner* — Daryl Pope
(74) *Attorney, Agent, or Firm* — Armstrong Teasdale LLP

(57) ABSTRACT

An improved life safety system provides ability to detect a catastrophic failure within a network node of the life safety system, and to subsequently pass a failsafe alarm signal through a network node, and through the life safety system, despite the catastrophic failure, which may be a failed main processor of a main panel, a failed main processor of a loop expander module, a failed main processor of an amplifier, or a failed main processor of a liquid crystal display controller.

11 Claims, 8 Drawing Sheets

METHOD FOR PASSING A FAILSAFE ALARM SIGNAL THROUGH A LIFE SAFETY SYSTEM THAT EXPERIENCES A CATASTROPHIC FAILURE

BACKGROUND

1. Field of the Invention

The field of the invention relates to life safety systems generally, and more particularly to certain new and useful advances in detecting an alarm condition and propagating a failsafe alarm signal under catastrophic failure conditions within a life safety system itself, of which the following is a specification, reference being had to the drawings accompanying and forming a part of the same.

2. Discussion of Related Art

Life safety systems, including fire detection systems and mass notification systems, include many components, such as fire notification devices, mass notification devices, network adapters, amplifiers, and the like, each of which may include firmware and/or one or more microprocessors. Without backup or other failsafe designs, a catastrophic failure within a life safety system can put lives at risk. Examples of a catastrophic failure include, but are not limited to, at least an inoperable microprocessor, defective firmware, and the like.

A common approach to protecting a microprocessor-based life safety system against catastrophic system failure is to include one or more redundant microprocessors and one or more redundant memory components in the microprocessor-based life safety system. This approach, though effective, is a relatively complex and expensive solution; and the increased system complexity sometimes actually reduces the reliability of the microprocessor-based life safety system. Moreover, this approach does not properly address catastrophic failures caused by defective firmware. For example, with the primary microprocessor and its redundant microprocessor each running the same application firmware, there is little reason to expect that the redundant microprocessor would produce a different result when faced with the same firmware defect(s) as the primary microprocessor. FIG. 3 is a high level block diagram of a conventional primary processor 301, which includes a core microprocessor 304 coupled with a power conditioner 302, a nonvolatile (flash) memory 305, a clock 303, and a volatile (ram) memory 306.

Less complex failsafe mechanisms than redundant microprocessors and redundant memories have existed previously, but knowledge and teachings in the art have heretofore restricted their scope of application to a single node on a network. The term "network node" is defined below. Examples of such less complex failsafe mechanisms include EST3 and IRC3 life safety systems. Although effective at minimizing a node's chances of experiencing catastrophic failure, these less complex failsafe mechanisms do not adequately address how to propagate alarms though a life safety system when one or more network nodes distributed across the life safety system become inoperable or operate in a defective manner.

What is needed is a relatively simple and inexpensive safeguard that permits a life safety system to continue functioning in the event of a catastrophic failure within the life safety system.

SUMMARY

The drawbacks described above are overcome by embodiments of an improved life safety system described herein, which includes one or more network nodes in communication with each other via a data bus. Use of the data bus permits a failsafe alarm signal to be transmitted across network connections and ensures the continued signaling of alarm conditions within the life safety system—even when there is a catastrophic failure to one or more subcomponents within the life safety system.

An embodiment of a method of operating a life safety system may include detecting a catastrophic failure within a network node of a life safety system. The method may further include generating a fault signal indicative of the detected catastrophic failure. The method may further include detecting an alarm condition indicative of a life safety emergency. The method may further include passing a failsafe alarm signal through the life safety system despite the detected catastrophic failure.

An embodiment of a life safety system may include a network node coupled with a data bus. The network node may include a main processor and a subcomponent. The subcomponent may be configured to detect a failure of the main processor, to detect an alarm condition indicative of a life safety emergency, and, in response to the alarm condition, to pass a failsafe alarm signal through a network node, and through the life safety system, via the data bus despite the detected failure of the main processor.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

DETAILED DESCRIPTION

Specific configurations and arrangements of the claimed invention, discussed below with reference to the accompanying drawings, are for illustrative purposes only. Other configurations and arrangements that are within the purview of a skilled artisan can be made or used without departing from the spirit and scope of the appended claims. For example, while some embodiments of the invention are herein described with reference to life safety systems, a skilled artisan will recognize that embodiments of the invention can be implemented in any networked system having two or more nodes, each of which contain at least a microprocessor, firmware, and/or a microcontroller.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Life Safety System

Figure 1:
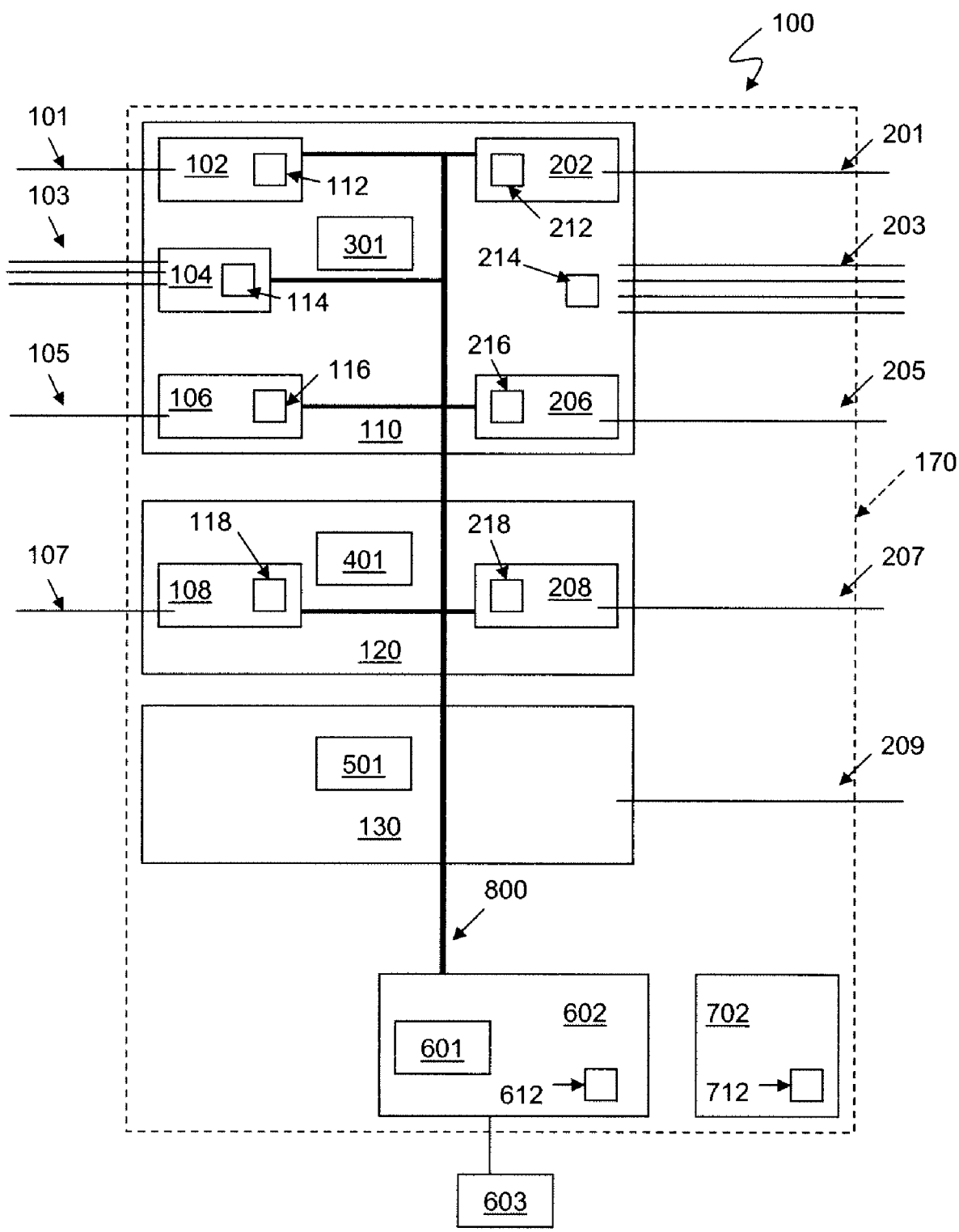
FIG. 1 is a block diagram of an embodiment of a life safety system configured in accordance with principles of the invention.

FIG. 1, 4, 5, 6, 7, 8 provide high-level block diagrams of an embodiment of a life safety system 100, configured in accordance with principles of the invention to permit the life safety system 100 to continue functioning in the event of a catastrophic failure within a network node 170 of the life safety system 100.

Referring primarily to FIG. 1, but also to FIGS. 4, 5, 6, 7, and 8, an embodiment of the life safety system 100 includes a network node 170 having one or more expansion modules 110, 120, 130, 602, 702. At least the expansion modules 110, 120, 130, and 602 are coupled with a data bus 800, which is internal to the network node 170.

Each expansion module 110, 120, 130, 602 includes at least a main processor. Each expansion module 110, 120, 130, 602 may also include a subcomponent. For example, the expansion module 110 illustratively includes a main processor 301, coupled with one or more subcomponents 102, 202, 104, 106, and 206 that are each coupled with the data bus 800. Although the connection is not shown, a microcontroller 214 of the expansion module 110 may also be coupled with the data bus 800 in another embodiment.

The expansion module 120 illustratively includes a main processor 401, coupled with one or more subcomponents 108 and 208, which are each coupled with the data bus 800. Each of the one or more subcomponents 108, 208 may be configured to detect a failure of the main processor 401 and to detect an alarm condition indicative of a life safety emergency. The expansion module 130 illustratively includes a main processor 501.

The expansion module 602 illustratively includes a main processor 601 and a microcontroller 612. The microcontroller 612 may be coupled with the data bus 800.

The network adapter 170 may further include an expansion module 702, which includes a microcontroller 712.

Each of the subcomponents 102, 202, 104, 106, 206, 108, 208 described above may be configured to detect a failure of any main processor 301, 401, 501, or 601; and to detect an alarm condition indicative of a life safety emergency. Each of the subcomponents 102, 202, 104, 106, 206, 108, 208 may be further configured to pass a failsafe alarm signal ("1002" in FIGS. 5, 6, 7, and 8) through the network node 170 via the data bus 800 in response to the detected alarm condition, despite the detected failure of the main processor 301, 401, 501, or 601.

Although only one network node 170 is illustrated in the Figures, an embodiment of the life safety system 100 may include a plurality of network nodes. For example, one or more network nodes, configured the same as, or similar to, the network node 170 may be located at remote portions of the network media 101, 201, at remote portions of the relay contacts 103, at remote portions of the device loops 105, 205, and at remote portions of secondary device loops 107, 207.

Network Node

Still referring to FIGS. 1, 4, 5, 6, 7, and 8, a more detailed description of the one or more expansion modules 110, 120, 130, 602, 702 included in each network node 170 is now provided. For example, in one embodiment, the expansion modules 110, 120, 130, 602, 702 may include a main panel 110, a loop expander module 120, an amplifier 130, a liquid crystal display ("LCD") controller 602, and a light emitting diode ("LED")/Switch adapter 702. The LCD controller 602 may be coupled with a liquid crystal display 603.

The main panel 110 includes the main processor 301, the microcontroller 214, and the subcomponents 102, 202, 104, 106, and 206 mentioned above. Examples of the subcomponents of the main panel 110 include, but are not limited to: network adapters 102, 202, a common relay 104, and loop adapters 106, 206. The network adapter 102 includes a microcontroller 112, and is coupled to the network media 101. The network adapter 202 includes a microcontroller 212, and is coupled to the network media 201. The common relay 104 includes a microcontroller 114, and is coupled to the relay contacts 103.

The loop adapter 106 includes a microcontroller 116, and is coupled to the device loop 105. The loop adapter 206 includes a microcontroller 116, and is coupled to the device loop 205. The device loop 105 and the device loop 205 may contain several hundred devices each. The main panel 110 further includes a microcontroller 214 coupled with the NAC/Sounder 203.

Figure 2:
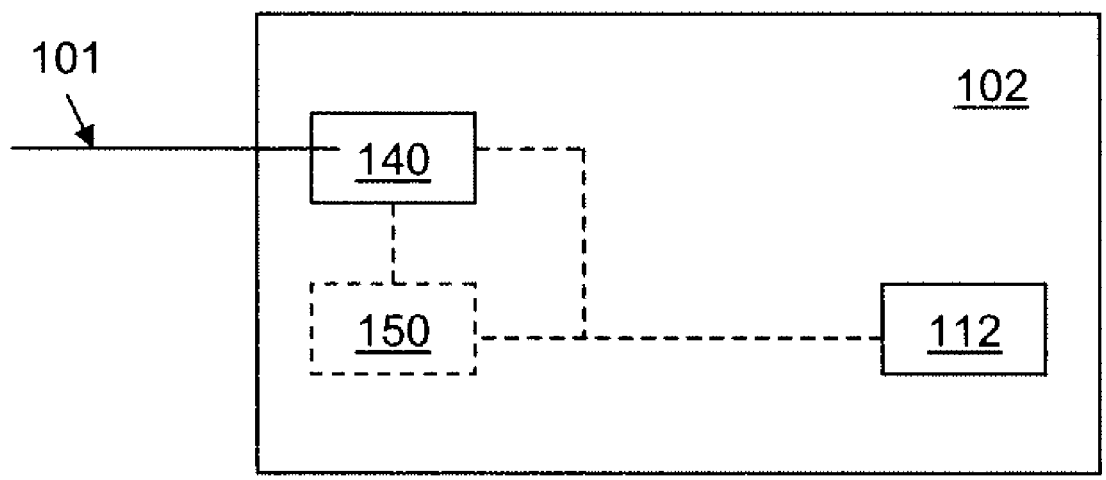
FIG. 2 is a block diagram of an exemplary network adapter configured for use in a the embodiment of the life safety system of FIG. 1.
Figure 3:
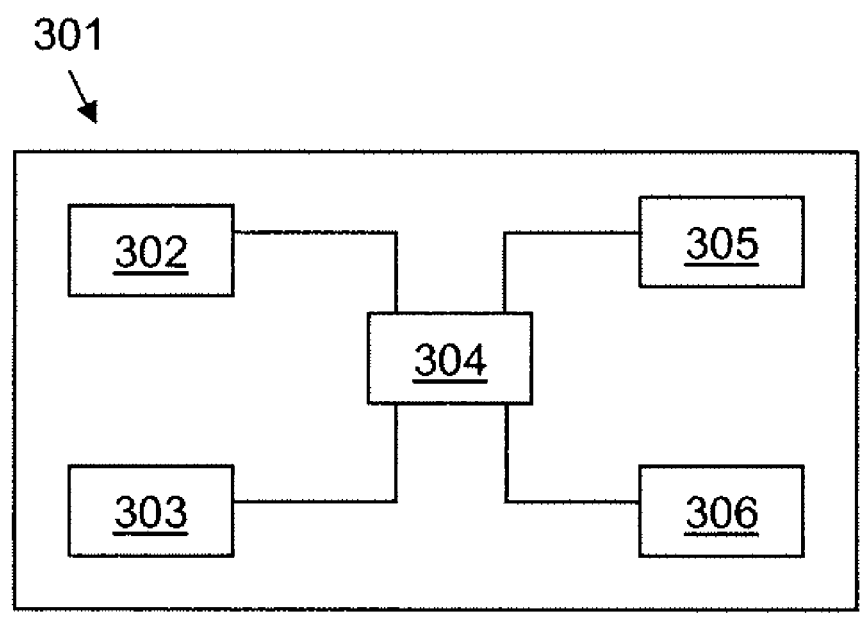
FIG. 3 is a block diagram of a conventional main processor, which may be used in the embodiment of the life safety system of FIG. 1.

An embodiment of a network adapter 102 is shown in the block diagram of FIG. 2. As shown in FIG. 2, the network adapter 102 includes a microcontroller 112 coupled with a transceiver 140, which is coupled with the network media 101. Optionally, a waveform generator 150 is coupled with both the microcontroller 113 and the transceiver 140. The microcontroller 112 is configured to manage the operation of the transceiver 140, and may optionally be configured to manage the operation of the waveform generator 150. Although not shown in FIG. 2, the network adapter 202 (of FIG. 1) includes the same components and be configured the same as the network adapter 102.

In an embodiment, the network adapters 102, 202 are an integral part of a failsafe communication link, because they are configured to detect an alarm condition (1001, 1101, 1201 in FIGS. 5, 6, 7, and 8) indicative of a life safety emergency, and to send a failsafe alarm signal (1002 in FIGS. 5, 6, 7, and 8) across the network media 101,201 that can be recognized by another network adapter on the other side of the network media 101,201.

Referring again to FIGS. 1, 4, 5, 6, 7, and 8, the loop expander module 120 includes its own main processor 401 and the subcomponents 108, 208 mentioned above. Examples of the subcomponents of the loop expander module 120 include, but are not limited to, the additional loop adapters 108 and 208. The loop adapter 108 includes a microcontroller 118, and is coupled with a secondary device loop 107. The loop adapter 208 includes a microcontroller 218, and is coupled with a secondary device loop 207. Each of the secondary device loops 107 and 207 may include several hundred devices each.

Another example of an expansion panel that may be included within a network node 170, the amplifier 130 includes its own main processor 501, and is configured to amplify a fault signal ("901" in FIG. 4) and a failsafe alarm signal ("1002" in FIGS. 5, 6, 7, and 8) passing through the life safety system 100 over the data bus 800. The amplifier 130 is coupled with a speaker circuit 209.

Another example of an expansion panel that may be included within a network node 170, the LCD controller 602 includes its own main processor 601 and a microcontroller 612. Although the connection is not shown, the microcontroller 612 may be coupled with the data bus 800 in one embodiment.

Another example of an expansion panel that may be included within a network node 170, the LED/Switch adapter 702 includes a microcontroller 712.

Data Bus

In an embodiment, the expansion panels 110, 120, 130, 602 are communicatively coupled via the data bus 800 mentioned above. In particular, the data bus 800 couples the main panel 110 with the loop expander module 120, couples the loop expander module 120 with the amplifier 130, and couples the amplifier 130 with the LCD controller 602. In an embodiment, the data bus 800 is part of a single failsafe communication link provided within each network node 170 of the life safety system 100 that allows an alarm condition to be signaled internally in the event of a catastrophic failure within the life safety system 100.

In one embodiment, the data bus 800 is placed in a logic high state during normal operation of the network node 170. To pass a failsafe alarm signal (1002 in FIG. 5) through the network node 170, and through the life safety system 100, a subcomponent 102, 202, 104, 106, 206, 108, 208 (or a microcontroller 214, 612) of the network node 170 is configured to pull the data bus 800 low when both a failure of a main processor 301, 401, 501, or 601 and an alarm condition indicative of a life safety emergency are detected. As further explained below, detecting the alarm condition may include receiving an alarm signal from an expansion panel of a remote network node (not shown) or receiving an alarm signal from a remote alarm device.

Figure 4:
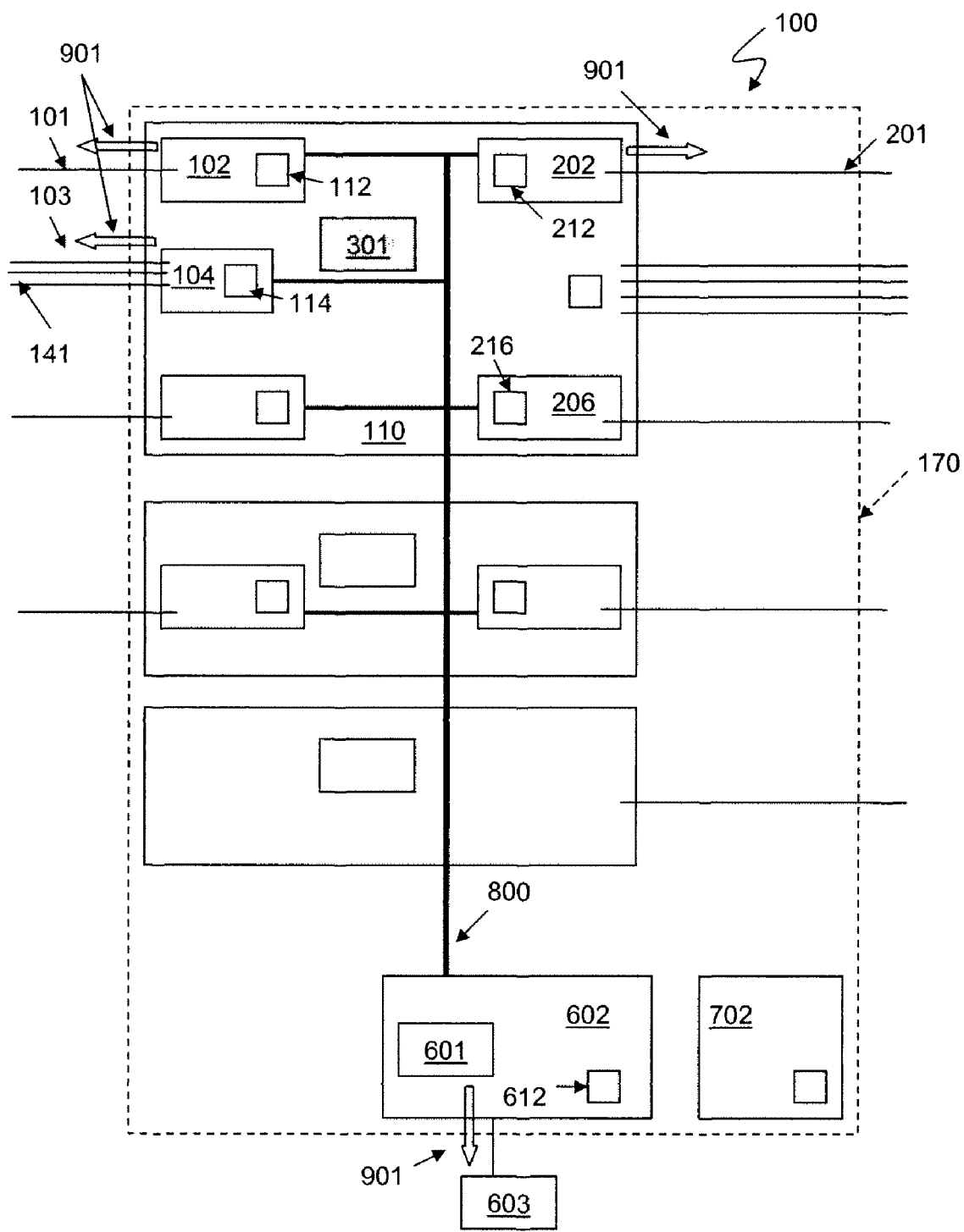
FIG. 4 is a block diagram of the embodiment of the life safety system of FIG. 1 illustrating fault signaling that occurs when a main processor becomes inoperable.

FIG. 4 is a block diagram of the embodiment of the life safety system 100 of FIG. 1 illustrating fault signaling 901 that occurs when a main processor 301 in the main panel 110 becomes inoperable (e.g., suffers a catastrophic failure). The fault condition is relayed over the data bus 800 as the fault signal 901 to various components of the network node 170, and to one or more remote components of the life safety system 100, even though the main processor 301 has failed.

For example, when the main processor 301 fails, one or more remote panels (not shown) that form part of the network media 101, 201 may detect the microprocessor failure and signal 901 the fault condition through out each of the expansion modules 110, 120, 130, and 602. For example, the fault condition may be signaled 901 on a relay trouble contact 141, of the relay contacts 103; and signaled 901, via the LCD controller 602, on a user interface in the form of visible, audible, and text indications. The user interface may be displayed on a liquid crystal display 603 operated by the LCD controller 602.

Figure 5:
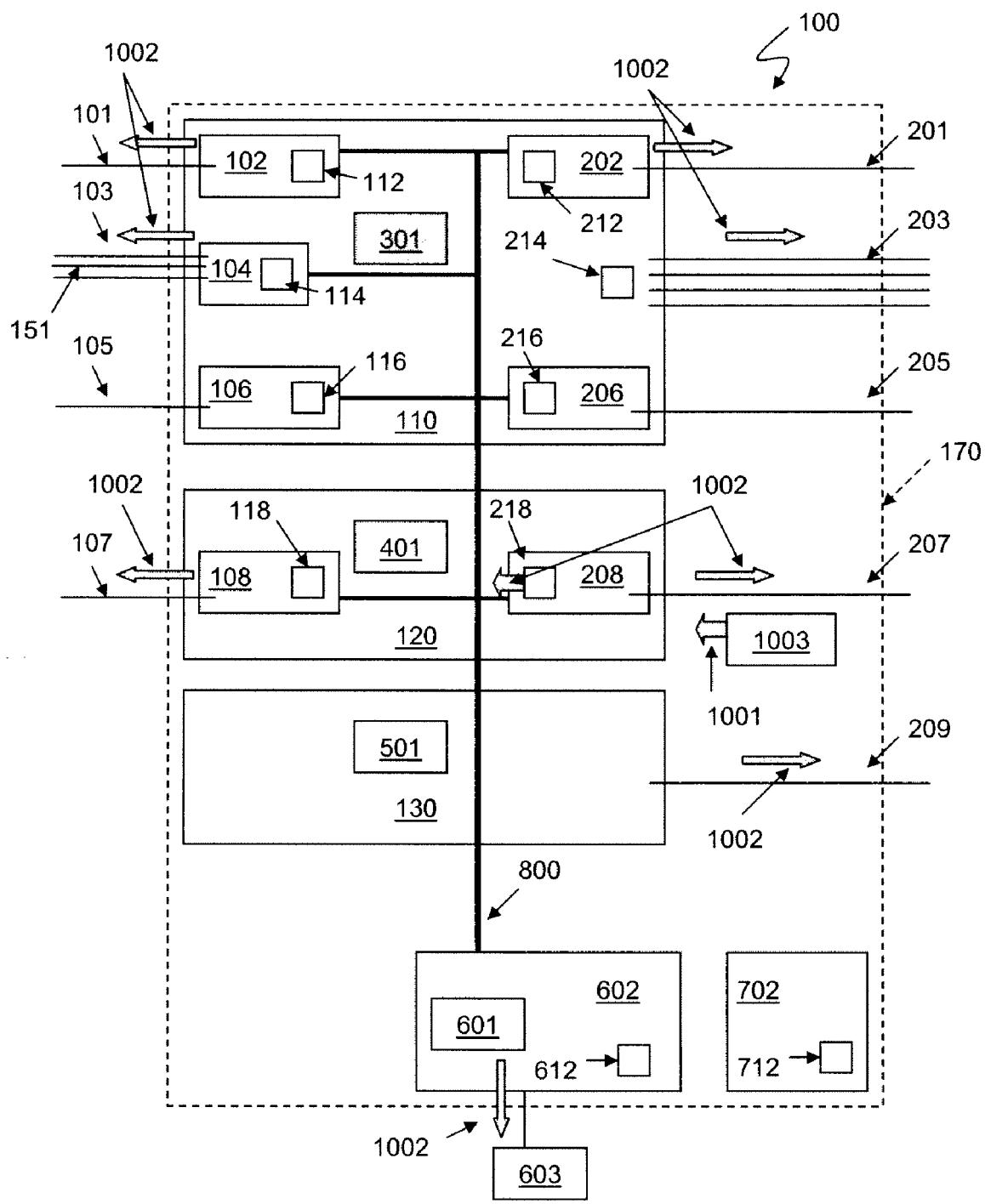
FIG. 5 is a block diagram of the embodiment of the life safety system of FIG. 1 illustrating alarm signaling that occurs when the main processor becomes inoperable and a remote alarm device, coupled with a secondary device loop, signals an alarm condition.

FIG. 5 is a block diagram of the embodiment of the life safety system 100 of FIG. 1 illustrating alarm signaling 1001, 1002 that occurs when the main processor 301 of the main panel 110 becomes inoperable and a remote alarm device 1003, coupled with a secondary device loop 207, activates to generate and transmit an alarm signal 1001 to the expansion module 110.

Referring to FIG. 5, subsequent to a failure of the main processor 301, the alarm device 1003, on the secondary device loop 207, may generate and transmit the alarm signal 1001, which indicates the existence of a life safety emergency, such as a fire. When this occurs, a failsafe alarm signal 1002 will be generated by the microcontroller 218 of the loop adapter 208 and propagated through network node 170, and through the life safety system 100, over the data bus 800.

In one embodiment, the failsafe alarm signal 1002 causes outputs on the secondary device loop 107 and outputs on the device loops 105, 205 to be activated; causes outputs on an alarm relay 151 and outputs on a speaker circuit 209 to be activated; causes outputs for the NAC/sounder 203 to be activated; and causes outputs for the network media 101, 201 to be activated. Additionally, the failsafe alarm signal 1002 causes a failsafe alarm condition to be annunciated on a user interface displayed on a liquid crystal display 603, which is controlled by the LCD controller 602. This operation is the same when the LCD controller 602 is configured as a repeater/remote annunciator.

In an embodiment, the failsafe alarm signaling 1002 across the life safety system 100 is bi-directional. For example, the failsafe alarm signal 1002 can originate on a network node, such as main panel 110, that has a failed subcomponent, such as main processor 301. Alternatively, the failsafe signal 1002 can originate elsewhere within the life safety system 100 and be propagated to, and through, any failed network node. The form of the failsafe alarm signal 1002 depends on the technology of the network connection(s). For a DSL or RS485 network connection, the failsafe alarm signal 1002 may be an analog signal in the about 400 Hz to about 4,000 Hz frequency range.

In an embodiment, the loop expander module 120 will have full knowledge of the outputs and sounders to control its secondary device loops 107, 207 via stored programming. Other outputs in the network node 170, and in the life safety system 100, may default to common alarm protocols.

Figure 6:
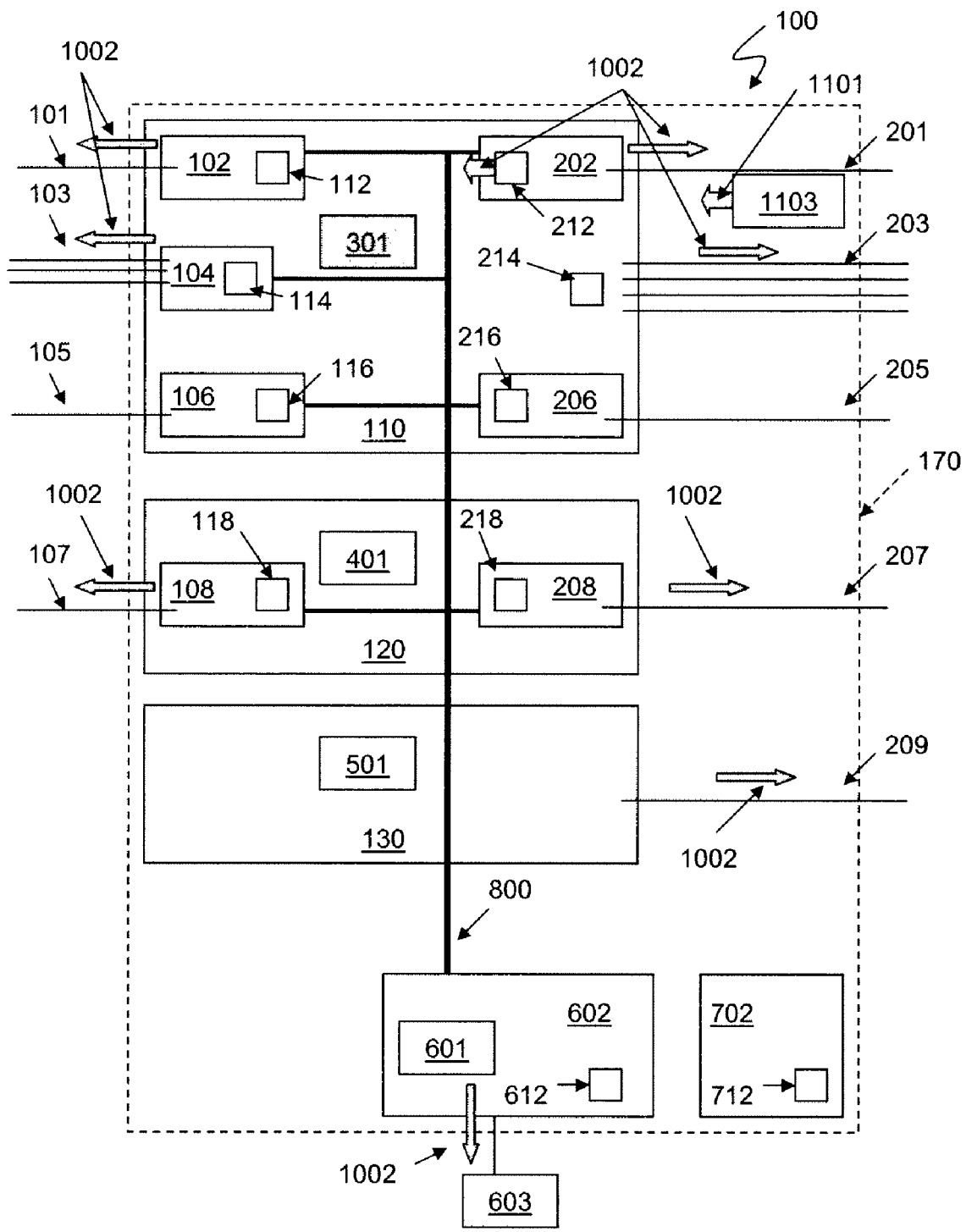
FIG. 6 is a block diagram of the embodiment of the life safety system of FIG. 1 illustrating alarm signaling that occurs when the main processor becomes inoperable and a remote panel signals an alarm condition.

FIG. 6 is a block diagram of the embodiment of the life safety system 100 of FIG. 1 illustrating alarm signaling 1101, 1002 that occurs when the main processor 301 becomes inoperable and a remote expansion panel 1103 in network media 201 activates to generate and transmit an alarm signal 1101, which indicates the existence of a life safety emergency. When this occurs, the failsafe alarm signal 1002 may be generated by the microcontroller 212 of the network adapter 202 and thereafter propagated through the life safety system 100 as described above with reference to FIG. 5. For example, subsequent to the failure of the main processor 301, the network adapter 202 will sense an alarm signal 1101 generated by the remote expansion panel 1103 and will generate the failsafe alarm signal 1002 back to the remote expansion panel 1103. In effect, this is similar to a local alarm activation under normal operating conditions. The network adapter 202 will also pass the failsafe alarm signal 1002 through the main panel 110 that has failed to the rest of the life safety system 100. This "pass-through" capability of the failsafe alarm signal 1002 is active even if the network adapters 102, 202 are configured for different media—for example, RS485 to single mode fiber.

Figure 7:
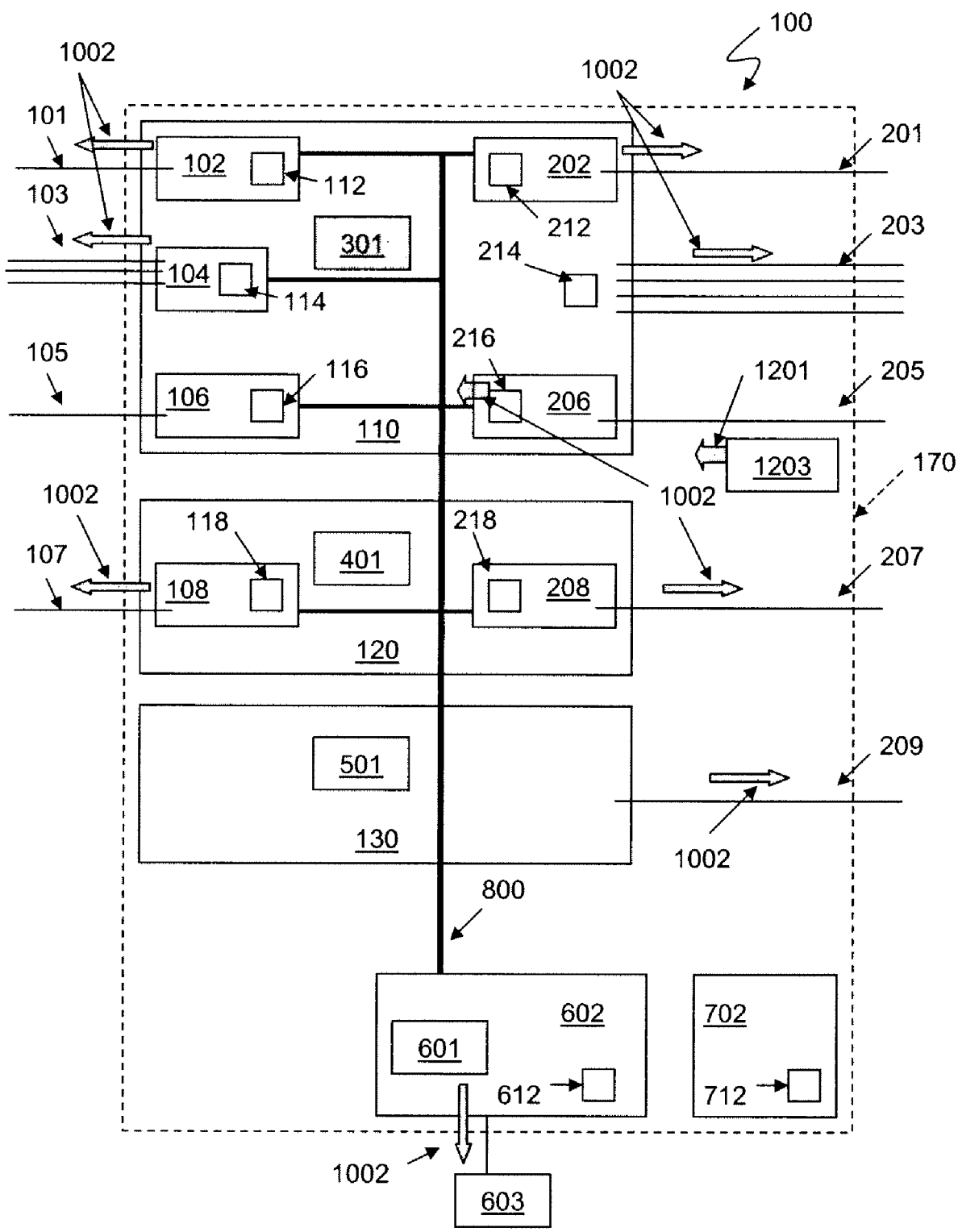
FIG. 7 is a block diagram of the embodiment of the life safety system of FIG. 1 illustrating alarm signaling that occurs when the main processor becomes inoperable and an alarm device, coupled with a main device loop, signals an alarm condition.

FIG. 7 is a block diagram of the embodiment of the life safety system 100 of FIG. 1 illustrating alarm signaling 1201, 1002 that occurs when the main processor 301 becomes inoperable and an alarm device 1203, coupled with a device loop 205, activates to generate and transmit an alarm signal 1201, which indicates the existence of a life safety emergency. When this occurs, the failsafe alarm signal 1002 may be generated by the microcontroller 216 of the loop adapter 208 and thereafter propagated through the life safety system 100 as described above with reference to FIG. 5. FIG. 7 further illustrates that when an alarm device 1203 activates, even the failure of the main processor 301 does not lose or drop an alarm signal 1201. The alarm device 1203 will make the decision to alarm, and because the microcontroller 216 on the loop adapter 208 will detect the alarm condition and assert the failsafe alarm signal 1002. Thus, all alarm devices 1203 are still capable of signaling an alarm even in the event a catastrophic failure within the life safety system 100.

Figure 8:
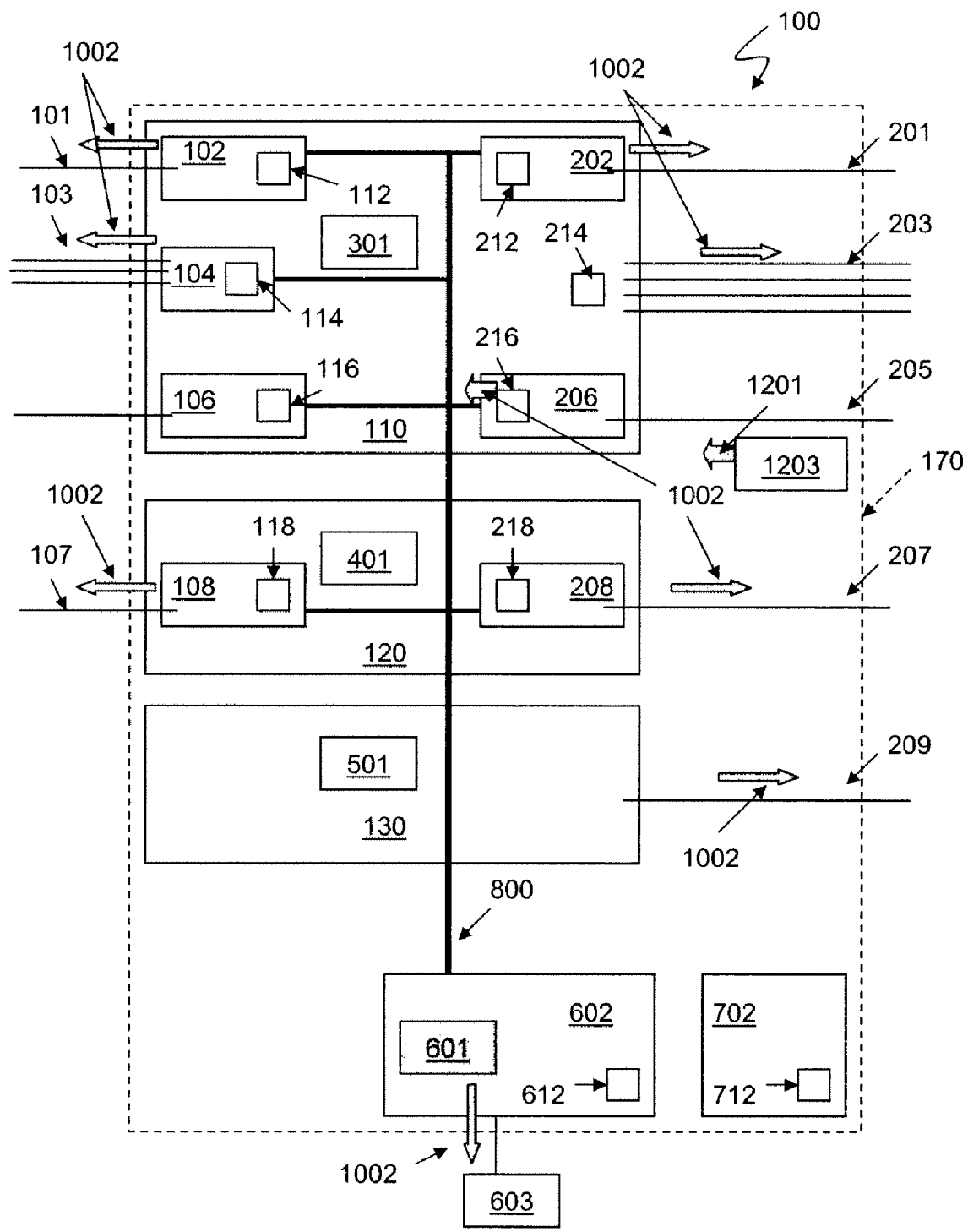
FIG. 8 is a block diagram of the embodiment of the life safety system of FIG. 1 illustrating alarm signaling that occurs when a main processor in a LCD controller becomes inoperable and an alarm device, coupled with the main device loop, signals an alarm condition.

FIG. 8 is a block diagram of the embodiment of the life safety system 100 of FIG. 1 illustrating alarm signaling that occurs when a main processor 601 in a LCD controller 602 becomes inoperable and an alarm device 1203, coupled with the device loop 205, activates to generate and transmit an alarm signal 1201, which indicates the existence of a life safety emergency. When this occurs, the failsafe alarm signal 1002 may be generated by the microcontroller 216 of the loop adapter 208 and thereafter propagated through the life safety system 100 as described above with reference to FIG. 5. FIG. 8 further illustrates that if the main processor 601, which controls a user interface (not shown), fails, then the visible, audible, and text fault indications will indicate failure. In an embodiment, this may include blinking or blanking the liquid crystal display 603, which is controlled by the LCD controller 602.

Figure 9:
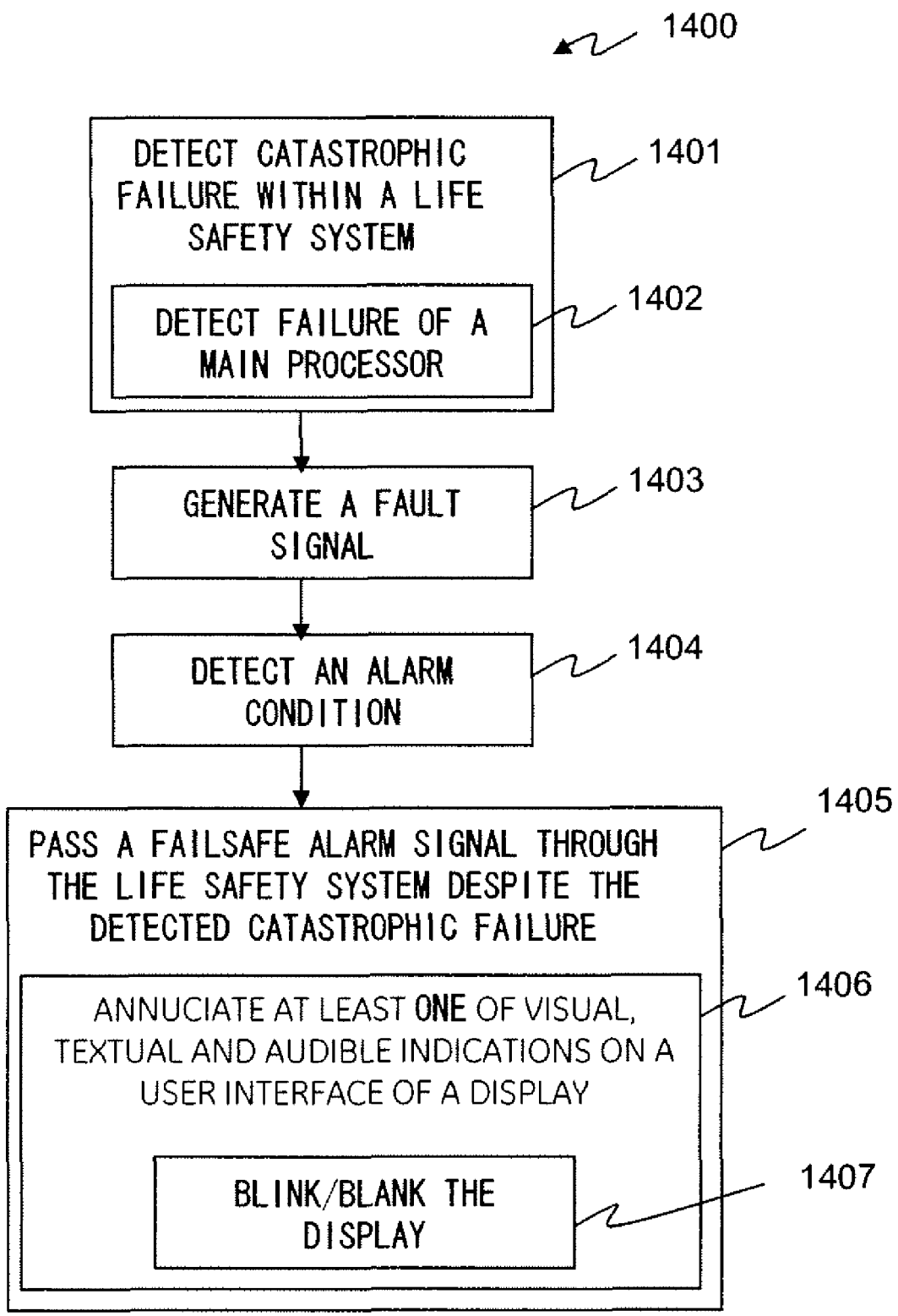
FIG. 9 is a flowchart of an embodiment of a method of operating an embodiment of the life safety system of FIG. 1 in the event of a catastrophic failure within the life safety system.

FIG. 9 is a flowchart illustrating functions of an embodiment of a method 1400 of operating an embodiment of a life safety system 100. Unless otherwise indicated, the functions of the method, represented by functional blocks 1401, 1402, 1403, 1404, 1405, 1406, and 1407 may be performed sequentially, simultaneously, or in any suitable order. Referring to FIGS. 1 and 9, as represented by functional block 1401, the method 1400 includes detecting a catastrophic failure within a life safety system 100. As represented by functional block 1402, the function of detecting a catastrophic failure includes detecting a failure of a main processor 301, 401, 501, 601 in a network node 170 of a life safety system 100. As represented by functional block 1403, the method 1400 further includes generating a fault signal indicative of the detected catastrophic failure. The fault signal may be any of the fault signals 901 in FIG. 4. As represented by functional block 1404, the method 1400 further includes detecting an alarm condition indicative of a life safety emergency. The alarm signal may be any of the alarm signals 1001, 1101, or 1201 of FIGS. 5, 6, 7, and 8. As represented by functional block 1405, the method 1400 further includes generating and passing a failsafe alarm signal through the life safety system 100 in spite of the detected catastrophic failure. The failsafe alarm signal may be the failsafe alarm signal 1002 in FIGS. 5, 6, 7, and 8. As represented by functional block 1406, the function of passing a failsafe alarm signal through the life safety system 100 may further include annunciating at least one of visual, textual, and audible indications on a user interface of a liquid crystal display 603, which is controlled by the LCD controller 602. As represented by functional block 1407, the function of asserting a failsafe alarm signal may further include blinking or blanking a liquid crystal display 603.

Each block, or combination of blocks, depicted in the flowchart of FIG. 9 can be implemented by computer program instructions. These computer program instructions may be loaded onto, or otherwise executable by, a computer processor, such as the main processor 301, 401, 501, or 601 or other programmable apparatus, such as any of microcontrollers 112, 114, 116, 118, 214, 216, 218, 612 to produce a machine, such that the instructions which execute on the computer processor or other programmable apparatus create means or devices for implementing the functions specified in the flowchart of FIG. 9. These computer program instructions may also be stored in a computer-readable memory that can direct the computer processor or other programmable apparatus to function in a particular manner, such that the instructions stored in the computer-readable memory produce an article of manufacture, including instruction means or devices which implement the functions specified in the block diagrams of FIGS. 1, 2, 4, 5, 6, 7, and 8, and in the flowchart of FIG. 9.

There is an economic advantage and a reliability advantage of using the simplified embodiment of the life safety system 100 described herein as compared to using the complex redundant microprocessor implementation previously in use. Moreover, without the implementation of a failsafe alarm signaling method and system as herein described, the capacity of redundant microprocessor based systems is limited by European codes and standards. Advantages of economies of scale can be realized once an embodiment of the failsafe alarm signaling method and system is implemented.

Embodiments of the invention herein described and claimed may provide one or more technical effects. With reference to FIGS. 5, 6, 7, and 8, one technical effect is passing a failsafe alarm signal 1002, via a data bus 800, through one or more expansion modules 110, 120, 130, 602 of a network node 170, and through the life safety system 100, despite one or more failed main processors 301, 401, 501, 601. Use of the data bus 800 is opposite prior teachings in the art to use complex architecture that requires redundant microprocessors.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

What is claimed is:

1. A method comprising:
   detecting a failure of a processor within a network node of a life safety system;
   generating, via a subcomponent assigned to the processor, a fault signal indicative of the detected failed processor;
   detecting, via the subcomponent, an alarm condition indicative of a life safety emergency; and
   passing, via the subcomponent, a failsafe alarm signal through the network node despite the failure of the processor.

2. A method in accordance with claim 1, wherein passing a failsafe alarm signal through the network node further comprises annunciating at least one of a visual, a textual, and an audible indication on a user interface of a liquid crystal display.

3. A method in accordance with claim 2, wherein annunciating at least one of a visual, a textual, and an audible indication further comprises one of blinking and blanking the liquid crystal display.

4. A life safety system, comprising:
   a network node including one or more expansion panels communicatively coupled with a data bus, wherein each of the one or more expansion panels includes a processor and a subcomponent assigned to the processor, and wherein the subcomponent is configured to:
- detect a failure of the processor,
- detect an alarm condition indicative of a life safety emergency, and
- in response to the alarm condition, pass a failsafe alarm signal through the network node via the data bus despite the detected failure of the processor.

5. A life safety system in accordance with claim 4, wherein the subcomponent is further configured to pull the data bus low when the failure of the processor is detected and when an alarm condition indicative of a life safety emergency has been detected.

6. A life safety system in accordance with claim 4, wherein the network node includes a main panel coupled to the data bus.

7. A life safety system in accordance with claim 6, wherein the subcomponent is a network adapter included in the main panel.

8. A life safety system in accordance with claim 4, wherein the network node includes a loop expander module coupled to the data bus.

9. A life safety system in accordance with claim 8, wherein the subcomponent is a loop adapter included in the loop expander module.

10. A life safety system in accordance with claim 4, wherein the network node includes an amplifier coupled to the data bus.

11. A life safety system in accordance with claim 4, wherein the network node includes a liquid crystal display controller coupled to the data bus.

* * * * *